Oct. 12, 1965 T. E. BRAY 3,211,900

ANALOG MULTIPLIER CIRCUITS USING AN ELECTROLUMINESCENT ELEMENT

Filed Nov. 1, 1961 2 Sheets-Sheet 1

INVENTOR:
THOMAS E. BRAY,

BY Marvin L. Goldenberg

HIS ATTORNEY.

Oct. 12, 1965 T. E. BRAY 3,211,900

ANALOG MULTIPLIER CIRCUITS USING AN ELECTROLUMINESCENT ELEMENT

Filed Nov. 1, 1961 2 Sheets-Sheet 2

INVENTOR:
THOMAS E. BRAY,

BY Marvin A. Goldenberg
HIS ATTORNEY.

United States Patent Office 3,211,900
Patented Oct. 12, 1965

3,211,900
ANALOG MULTIPLIER CIRCUITS USING AN ELECTROLUMINESCENT ELEMENT

Thomas E. Bray, Clay, N.Y., assignor to General Electric Company, a corporation of New York Filed Nov. 1, 1961, Ser. No. 149,397
3 Claims. (Cl. 235—194)

The present invention relates to novel analog multiplier circuits and particularly to analog multiplier circuits having a configuration of minimum complexity and which are economical to fabricate.

In complex computer equipments a large number of interconnected network components are commonly required for performing various logic and storage functions. Since they are employed in large numbers it is highly desirable that the components be of miniature size with low power requirements, and yet have adequate gain where necessary. The present invention is directed to multiplier components which satisfy the above and additional requirements, being therefore suitable for operation in many forms of computer systems. The invention is particularly useful in self-adaptive computer systems such as disclosed in an article by C. L. Coates and E. A. Fisch entitled "Design of a Solid State Neuron Circuit for Use in a Self Organizing System," appearing in the Digest of Technical Papers of the 1960 International Solid State Circuits Conference.

Accordingly, it is an object of the present invention to provide a novel analog multiplier circuit of minimum complexity and size and having low power requirements.

It is a further object of the present invention to provide a novel multiplier circuit which can be inexpensively and simply fabricated, such as in a printed circuit form.

It is still a further object of the present invention to provide a novel multiplier circuit which readily lends itself to applications where a large number of interconnected multiplier circuits are required.

It is another object of the present invention to provide a novel multiplier circuit which may be readily adapted to provide a visual output indication.

It is still another object of the present invention to provide a novel multiplier circuit having the above noted desirable characteristics which provides a four quadrant multiplication.

Briefly, these and other objects of the invention are accomplished in an electro-optical circuit which employs a light emissive member, such as an electroluminescent element, optically coupled to a photosensitive member, such as a photoconductive element, said elements forming an electroluminescent-photoconductor cell. A first variable input, which may be either a D.C. or A.C. voltage is applied to said electroluminescent element for controlling its emission. A second variable input, conventionally either a D.C. or A.C. voltage, is applied to the photoconductive element. The light emission from the electroluminescent element is a direct function of the first input voltage and the resistivity of the photoconductor is an inverse function of said light emission. The current flowing through the photoconductor is proportional to a product of the first and second input voltages. Should a load impedance be connected in series with said second input voltage and said photoconductor, the output voltage across said impedance is then similarly proportional to said product. Since the polarity or phase characteristic of the output voltage is determined solely by that of the second input voltage, a two quadrant multiplication is performed.

In accordance with the invention a four quadrant multiplication is performed by a circuit employing four interconnected electroluminescent-photoconductor cells. First and second input voltages each of positive or negative value, when considering D.C. voltages, are selectively applied to said cells by means of a polarity discriminator network, for example, a pair of oppositely poled diodes, to provide a product at one of two discrete outputs. One output corresponds to a product of plus value and the other output corresponds to a product of minus value. Positive values of said first input voltage are simultaneously coupled to the electroluminescent elements of a first pair of electroluminescent-photoconductor cells, and negative values of said first input voltage are simultaneously coupled to the electroluminescent elements of a second pair of said cells. Positive values of said second input voltage are simultaneously coupled to the photoconductor elements of one cell of each of said first and second pair of cells, and negative values of said second input voltage are simultaneously coupled to the photoconductor elements of the other cell of said first and second pair of cells. Thus, for a given input condition, only one of the four cells has both the electroluminescent and photoconductor elements thereof energized, and the current through the photoconductor of said one cell will be proportional to a product of the applied input voltages.

While the specification concludes with claims particularly pointing out and distinctly claiming the subject matter which is regarded as the invention, it is believed that the invention will be better understood from the following description taken in connection with the accompanying drawings in which:

Figure 1:
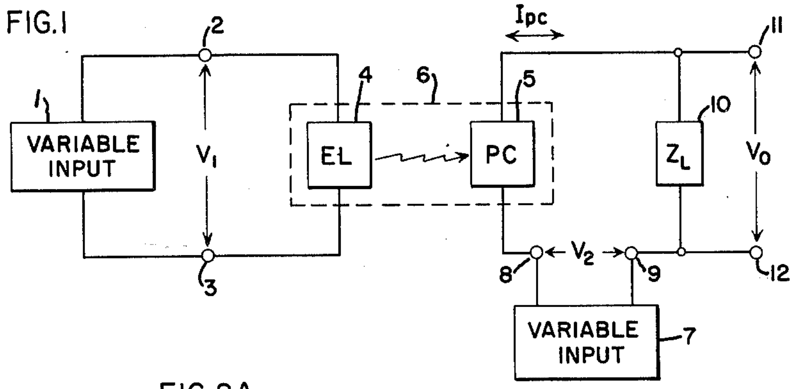
FIGURE 1 is a schematic diagram of a two quadrant electro-optical multiplier circuit in accordance with the invention.
Figure 2A:
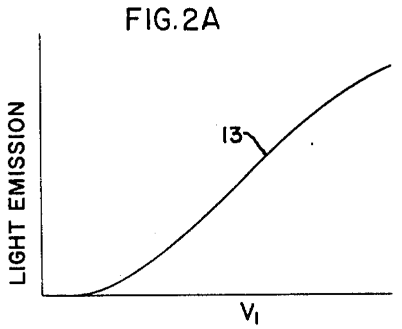
FIGURE 2A is a graph of the light emission characteristic of the electroluminescent element of FIGURE 1.
Figure 2C:
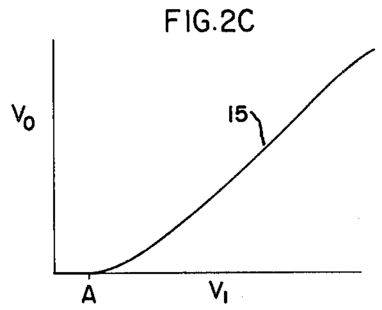
FIGURE 2C is a graph of the output voltage $V_0$ versus the input voltage $V_1$ of FIGURE 1.
Figure 2B:
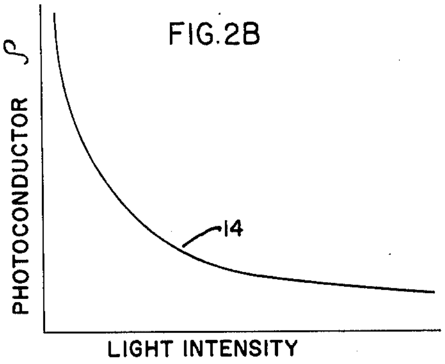
FIGURE 2B is a graph of the resistivity characteristic of the photoconductor element of FIGURE 1.
Figure 2D:
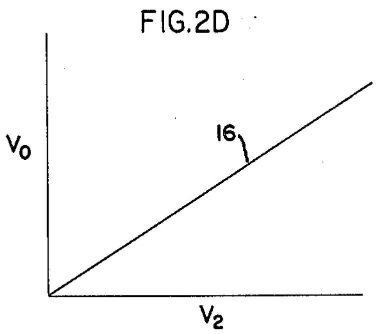
FIGURE 2D is a graph of the output voltage $V_0$ versus the input voltage $V_2$ of FIGURE 1.

Referring now to FIGURE 1, a two quadrant electro-optical analog multiplier is shown in which a first variable input voltage $V_1$ is multiplied by a second variable input voltage $V_2$ to provide an output product voltage $V_0$. A first source of variable voltage 1 providing $V_1$ is connected to a first pair of input terminals 2 and 3 which are connected respectively to either side of a light emissive element, illustrated as electroluminescent element 4. Electroluminescent element 4 is optically coupled to a photoconductor element 5, as illustrated by the arrow, the two elements forming an electroluminescent-photoconductor cell 6. A second source of variable voltage 7 providing $V_2$ is connected to a second pair of input terminals 8 and 9. Terminal 8 is connected to one side of photoconductor element 5, the other side being connected through a load 10 to terminal 9. As will be explained in greater detail presently, the impedance $Z_L$ of load 10 should be smaller than the light resistance $R_{pcL}$ of the photoconductor 5 for improved linearity of the output, and should be larger than $R_{pcL}$ for improved voltage gain. $V_0$ is taken across load 10 at output terminals 11 and 12, terminal 11 being coupled to the junction of photoconductor 5 and load 10 and terminal 12 being connected in common with input terminal 9. The emission of the electroluminescent element 4 as a function of the applied voltage $V_1$, and the resistivity of the photoconductor element 5 as a function of its light energization are normally nonlinear relationships as shown by curves 13 and 14 in FIGURES 2A and 2B, respectively. The current through the photoconductor 5, $I_{pc}$, is therefore a nonlinear function of $V_1$, as is output voltage $V_0$, shown by curve 15 in FIGURE 2C. In addition, $I_{pc}$ is linearly related to $V_2$, as is $V_0$ shown by curve 16 in FIGURE 2D. Accordingly, $I_{pc}$ is a function of the input voltages $V_1$ and $V_2$, and in fact is proportional to a nonlinear product of $V_1$ and $V_2$. The voltage $V_0$ across load 10 similarly is also proportional to a nonlinear prodouct of $V_1$ and $V_2$ A qualitative analysis of the above operation may be demonstrated as follows: The current $I_{pc}$ can be expressed as $$I_{pc}=\frac{V_2}{Z_L+R_{pc}} \qquad (1)$$

where $R_{pc}$ is the effective photoconductor resistance. If for purposes of simplicity of derivation it is assumed that $R_{pc}>>Z_L$, then $$I_{pc}\cong\frac{V_2}{R_{pc}} \qquad (2)$$

$R_{pc}$, being an inverse function of the voltage $V_1$, may be approximately expressed as $$R_{pc}\propto V_1^{-a} \qquad (3)$$

where $a$ is the constant for any particular electroluminescent-photoconductor cell arrangement. Thus, the current $I_{pc}$ may be expressed as $$I_{pc}\propto V_2\cdot V_1^{a} \qquad (4)$$

and the output voltage $V_0$ may be expressed as $$V_0\propto V_2\cdot V_1^{a}\cdot Z_L \qquad (5)$$

The input voltages $V_1$ and $V_2$ may be either in the form of steady state D.C. voltages, unidirectional pulses or A.C. voltages. Typical voltage magnitudes are in the order of 50–100 volts, and for A.C. inputs typical frequencies are in the order of 400 cps. In accordance with the type of inputs applied, the electroluminescent element 4 may be composed of a D.C. or A.C. field excited phosphor such as are well known in the art. For example, phosphors such as copper activated zinc sulfide (ZnS:Cu), gallium phosphide ($G_2P$) or silicon carbide (SiC) are suitable. Furthermore, other forms of light emissive devices can be used in lieu of an electroluminescent element, such as a small incandescent bulb or a glow discharge neon tube. The photoconductor element 5 may be composed of a sintered cadmium sulfphide photoconductive material or other conventional photoconductive materials, whose spectral characteristics are matched to the light emissive element. The light to dark resistance ratio of the photoconductor may range from less than 100 to greater than 1000, a typical minimum light resistance being approximately 500 ohms and a typical maximum dark resistance being in the megohm region.

The gain of the circuit of FIGURE 1 may be considered as having two components, one with respect to input voltage $V_1$ and the other with respect to input voltage $V_2$. The gain with respect to $V_1$ is dependent upon the magnitude of $V_2$ and may be several times greater than unity. The gain with respect to $V_2$ may never exceed unity and is inversely related to the ratio of the resistance of the photoconductor to the load impedance, $R_{pc}/Z_L$. Thus, the parameters of the circuit may be selected so that the ratio of the light resistance of the photoconductor to the load impedance $R_{pcL}/Z_L$, is in the order of 1 or less which gives good voltage gain without incurring intolerable nonlinearities. For applications where it is required to cascade a plurality of circuits of the type shown in FIGURE 1, good voltage gain is highly desirable so as to alleviate the requirement for interstage amplification. It is noted that when cascading stages, the load 10 is normally deleted and the output terminals 11 and 12 connected to either the first or second pair of input terminals of the following stage.

By improving the voltage gain as described above, there is an accompanying decrease in linearity in the intermediate and upper regions of the $V_0$ vs. $V_1$ curve, hence a decreased linearity of the output product. Thus, where improved linearity is desired the ratio $R_{pcL}/Z_L$ should be great. For example, a ratio equal to 5 or more will appreciably obviate nonlinearities in the intermediate and upper regions.

Figure 3:
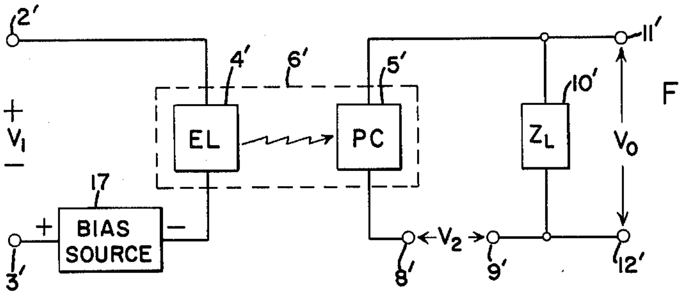
FIGURE 3 illustrates a modification of the embodiment of FIGURE 1.

It may be seen that a nonlinear characteristic also exists in the lower region of the $V_0$ vs. $V_1$ curve. This is due primarily to the threshold emission characteristic of the electroluminescent element and the resistivity characteristic of the photoconductor element. For applications where it may be desirable to obtain outputs in response to input voltages only in excess of a minimum value, this nonlinearity and its resulting threshold effect is useful. However, where such threshold operation is not desired, the linearity of the lower region of the $V_0$ vs. $V_1$ curve can be substantially improved by the introduction of a biasing network such as shown in FIGURE 3. FIGURE 3 is similar to FIGURE 1 and similar components are designated by the same reference characters given prime notations. A source of bias potential 17 is coupled between terminal 3' and the adjacent electrode of the electroluminescent element 4' for augmenting the excitation of element 4' provided by input voltage $V_1$. When considering input voltages in D.C. form, bias source 17 is poled in a direction such as to be summated with the applied input voltages across element 4'. Thus, for an input voltage $V_1$ of the polarity indicated, the bias source 17 has its positive terminal connected to terminal 3' and its negative terminal connected to the electroluminescent element 4'. For A.C. input voltages the bias source should be an A.C. voltage of somewhat greater frequency than the input frequency so as to avoid any beating effect between the bias frequency and the input frequency upon the electroluminescent element. A suitable bias frequency is about two times the input frequency. The voltage of source 17 is of a value on the order of the threshold potential of the electroluminescent element so that employment of the biasing network effectively shifts the origin of the $V_0$ vs. $V_1$ curve close to point A in FIGURE 2C, and thus substantially improves the linearity of the curve for low values of $V_1$. Connecting the bias source in the illustrated manner has the advantage of being able to provide a single bias source for a large plurality of A.C. electroluminescent elements where such elements have a common electrode. Such a configuration is pictured in FIGURE 4. As an alternative connection, a bias source plus a series isolating impedance element may be connected in parallel with the electroluminescent element.

Figures 4, 5, 6:
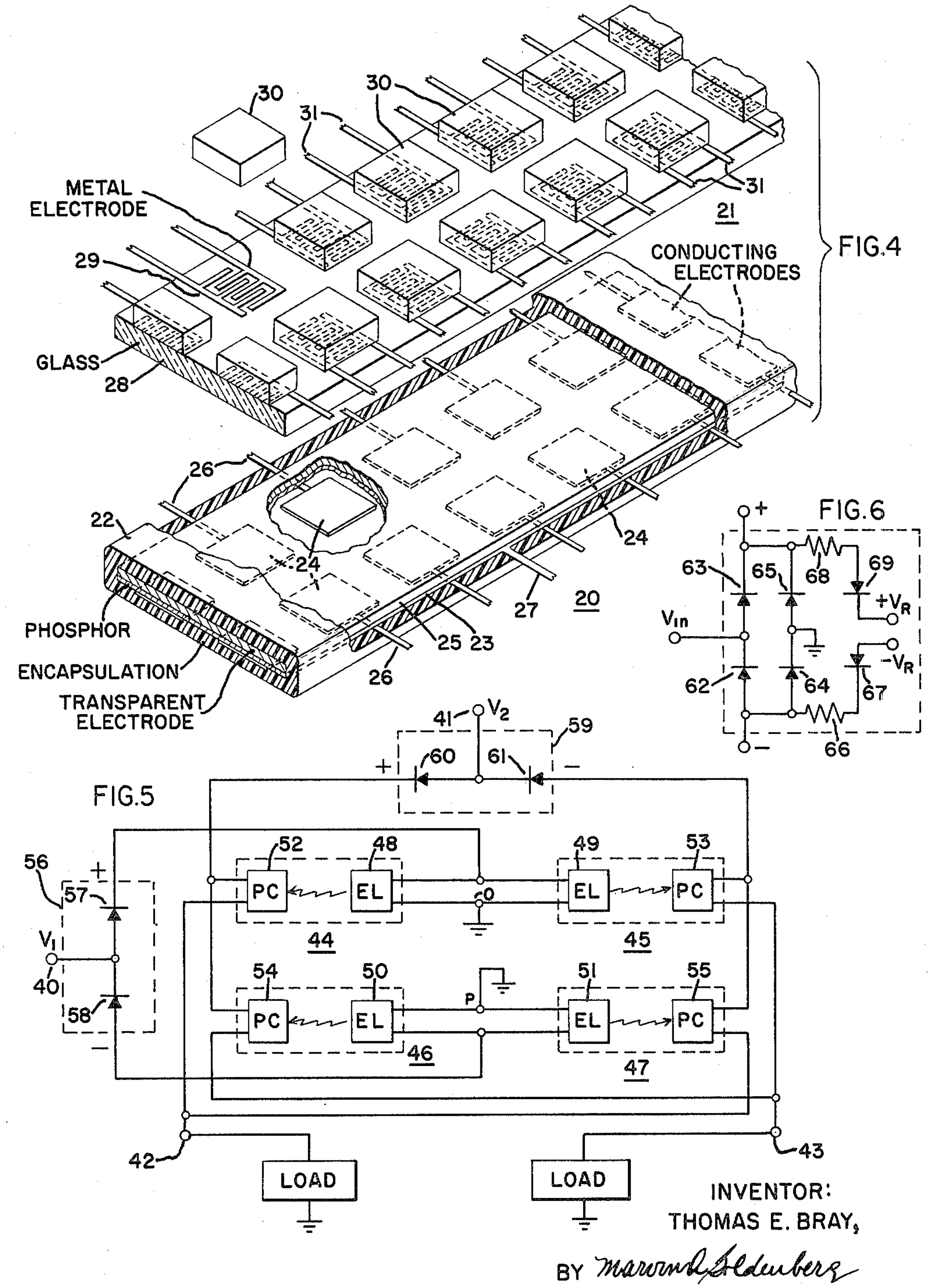
FIGURE 4 is an exploded perspective view of a fabricated array of electroluminescent and photoconductor elements which may be readily interconnected to form a plurality of two or four quadrant multiplier circuits.
FIGURE 5 is a schematic diagram of a four quadrant electro-optical multiplier circuit in accordance with the invention.
FIGURE 6 is a schematic diagram of a discriminator network that may be employed in the circuit of FIGURE 5.

In FIGURE 4 there is shown in detail an exploded perspective view, partially broken away, of a fabricated array of electroluminescent and photoconductor elements which may be readily interconnected to provide a plurality of multiplier circuits of the type illustrated in FIGURES 1, 3 and 5. For purposes of illustration only a limited representative number of elements are shown. The array includes an encapsulated electroluminescent assembly 20 and a photoconductor assembly 21. These assemblies, shown separated and in magnified perspective for greater clarity, are normally abutted together when the elements thereof are interconnected to provide multiplier operation.

The transparent encapsulating member 22 of the electroluminescent assembly 20, which may be a plastic Teflon material, seals the electroluminescent elements and protects the phosphor layer 23 from deterioration by the atmosphere. A plurality of metal electrodes 24, one for each electroluminescent element, is laid on the underside of the layer of phosphor material 23. The other side of the phosphor material has applied thereto a transparent conducting electrode 25. Leads 26 are connected to the metal electrodes 24 and lead 27 is connected to the transparent electrode 25. The photoconductor assembly includes a glass substrate layer 28 coated on the upper surface with a plurality of interdigital metal electrodes 29 which are each overlaid by an individual layer of photoconductor material 30. Leads 31 connect to the metal electrodes 29. When the assemblies are placed together the underside of the glass substrate 28 contacts the upper surface of the encapsulation and the interdigital metal electrodes 29 are aligned with corresponding metal electrodes 24. Radiation emitted from portions of the phosphor material lying between the metal electrodes 24 and the transparent electrode 25 is coupled through the transparent layers to the aligned photoconductor elements, and controls the resistivity of each photoconductor element in accordance with the excitation applied to the cooperating electroluminescent element. It may readily be appreciated that a single bias source for improving the linearity of the product outputs from all of the cells may be connected to the transparent conducting layer 25 of the electroluminescent assembly when the inputs to the electroluminescent elements are compatible.

Further, a visual output indication may be readily obtained, when required, by enlarging the metal electrodes 23 so that they extend beyond the border of the corresponding photoconductor elements, providing an illuminated outline around the cells visible from the upper, photoconductor side. Alternatively, metal electrodes 23 may be made transparent to provide an illuminated area visible from the under, electroluminescent side.

Referring now to FIGURE 5, there is illustrated a four quadrant electro-optical analog multiplier which may be readily fabricated in the form shown by FIGURE 4. There is applied between input terminal 40 and ground a first variable input voltage $V_1$ and between input terminal 41 and ground a second variable input voltage $V_2$. The inputs $V_1$ and $V_2$ can be in the form of steady state D.C. voltages or unidirectional pulses of positive or negative polarity. Alternatively, $V_1$ and $V_2$ may be A.C. voltages of 0° or 180° phase, indicative of plus and minus valued inputs. In the configuration of FIGURE 5, steady state D.C. input voltages will be considered. Between output terminals 42 and 43 and ground there are provided output voltages which are proportional to a product of the input voltages. The circuit comprises four electroluminescent-photoconductor cells 44, 45, 46 and 47 each of which has an electroluminescent element, 48, 49, 50 and 51 respectively, and a photoconductor element 52, 53, 54 and 55 respectively.

For steady state D.C. input voltages, D.C. type phosphors are employed in the electroluminescent elements 48 to 51. Accordingly, A.C. type phosphors are normally employed when applying A.C. or unidirectional pulse inputs.

The first variable input voltage $V_1$ is connected through a first polarity discriminator network 56 to the electroluminescent elements 48, 49, 50 and 51. The first discriminator 56 comprises a pair of oppositely poled diodes 57 and 58 for distinguishing between positive and negative values of $V_1$. Diode 57 serves to couple positive values of $V_1$ to the electroluminescent elements 48 and 49, the anode of diode 57 being connected to input terminal 40 and the cathode being connected in common with the inputs of elements 48 and 49, the outputs thereof being connected at point O to ground. Diode 58 serves to couple the negative values of $V_1$ to the electroluminescent elements 50 and 51, the cathode of diode 58 being connected to input terminal 40 and the anode being connected in common with the inputs of elements 50 and 51, the outputs thereof being connected at point P to ground.

The second variable input voltage $V_2$ is connected through a second polarity discriminator 59 to the photoconductor elements 52, 53, 54 and 55. Discriminator network 59 comprises oppositely poled diodes 60 and 61. Diode 60 serves to couple the positive values of $V_2$ to photoconductor elements 52 and 54, the anode of diode 60 being connected to input terminal 41 and the cathode being connected in common with the inputs of elements 52 and 54. The output of photoconductor 52 is connected to output terminal 42, and the output of photoconductor element 54 is connected to output terminal 43. Diode 61 serves to couple the negative values of $V_2$ to the photoconductor elements 53 and 55, the cathode of diode 61 being connected to input terminal 41 and the anode being connected in common with the inputs of elements 53 and 55. The output of photoconductor element 53 is connected to output terminal 43, and the output of photoconductor element 55 is connected to output terminal 42.

Considering the operation of the circuit of FIGURE 5, assuming positive $V_1$ and $V_2$ input voltages applied, electroluminescent-photoconductor cell 44 has both elements thereof energized and an output will appear at output terminal 42 indicative of a positive product of the input voltages. Accordingly, a positive $V_1$ and a negative $V_2$ will energize the elements of cell 45 producing an output at output terminal 43 indicative of a negative product; a negative $V_1$ and a positive $V_2$ will energize the elements of cell 46, also producing an output at output terminal 43; and a negative $V_1$ and a negative $V_2$ will energize the elements of cell 47 and produce an output at output terminal 42. Load impedances may be connected from terminals 42 and 43 to ground and the outputs obtained as a voltage across said impedances. The output terminals 42 and 43 may alternatively be connected to the input terminals of a subsequent stage.

When employing D.C. or unidirectional pulse input voltages, polarity discrimination may be performed by rectifying electrodes applied directly to the photoconductive material and to the phosphors of the electroluminescent elements, in lieu of the diodes illustrated.

In addition, if it is desired to determine the sign of the $V_1$, $V_2$ inputs which combine to provide a particular output, separate output quantities may be obtained from each cell by connecting individual output terminals to each photoconductor element. Thus, in FIGURE 5, four output terminals would be employed in lieu of the two shown.

Where A.C. input voltages are employed, the discriminator networks 56 and 59 must assume a different configuration than that shown in FIGURE 5 so as to provide voltages to the electroluminescent and photoconductor elements which are a function of the phase and amplitude of the input voltages. One possible configuration for the networks is illustrated in FIGURE 6 wherein the input terminal $V_{in}$ corresponds to either of input terminals 40 or 41 of networks 56 and 59, respectively, and the positive and negative output terminals correspond to the correspondingly identified output terminals of networks 56 and 59. Input voltages of one phase, indicative of a plus value, provide an output at the positive terminal, and input voltages of the opposite phase, indicative of a minus value, provide an output at the negative terminal. Terminal $V_{in}$ is coupled to the junction of the cathode of diode 62 and the anode of diode 63. The anode of diode 62 is connected to the negative output terminal, and the cathode of diode 63 is connected to the positive terminal. Shunt diodes 64 and 65 are provided with the anode of diode 64 connected to the negative output terminal, the cathode of diode 65 connected to the positive output terminal and the cathode and anode of diodes 64 and 65, respectively, connected to ground. The negative output terminal is also connected through a resistor 66 to the cathode of diode 67, the anode of diode 67 being connected to a negative reference A.C. voltage $-V_R$, which is in phase with the minus valued inputs. The positive output terminal is also connected through a resistor 68 to the anode of diode 69, the cathode of diode 69 being connected to a positive reference A.C. voltage $+V_R$, which is in phase with the plus valued inputs. The reference voltages are required to be of greater amplitude than the input voltages.

The network operates as follows: If we consider input voltages of a phase indicating a plus quantity, these voltages are said to be in phase with the reference voltage $+V_R$. During the positive half cycle an output voltage appears at the positive output terminal, diode 63 being biased in the forward direction and diodes 65 and 69 being biased in the backward direction. No output will appear at the negative output terminal since diode 62 is in a backward biased condition. No outputs will appear during the negative half cycle since diodes 65 and 69 are in the forward biased condition, as are diodes 64 and 67. Input voltages of a phase indicative of a minus quantity are in phase with the reference voltage $-V_R$ and, corresponding to the previous explanation, during the negative half cycle of the input a voltage will appear at the negative output terminal and during the positive half cycle no voltage will appear at neither output terminal. Thus, rectified positive and negative going output voltages will appear at their respective output terminals as a function of phase and amplitude of the input signals.

The circuit of FIGURE 5 may be further modified to include a pair of bias potential sources connected to the electroluminescent elements. Thus, considering D.C. operation, a first source may be connected between point O and ground having a polarity so as to be summated with the positive values of input voltage $V_1$ across electroluminescent elements 48 and 49, as described with respect to FIGURE 3. A second source may be connected between point P and ground having a a polarity so as to be summated with the negative values of $V_1$ across elements 50 and 51. For A.C. input voltages, a single source of A.C. bias potential may be employed coupled from the junction of points O and P to ground.

Although the invention has been described with respect to a few specific embodiments, it may be appreciated that numerous modifications may become apparent to those skilled in the art which do not exceed the basic principles disclosed. Thus, the basic characteristic of the first input quantity to the light emissive elements is that it electrically excite said elements into emission. The principal characteristic of the second input quantity is that it produce a current flow through the photoconductors. A voltage source as has been illustrated, is considered preferable for supplying this quantity. However, a current source connected either across the second input terminals or across a parallel combination of a photoconductor and a load impedance may also provide a useful multiplier circuit. In the first instance the output is a voltage taken across the photoconductor and in the second instance the output is taken across the load. Use of a current source as described may be seen to provide at the output a product of the inverse of the first quantity with the second quantity.

These and all other modifications falling within the true scope and spirit of the invention are intended to be included in the appended claims.

What I claim as new and desire to secure by Letters Patent of the United States is:

1. A multiplier circuit for obtaining a four quadrant product of a first variable electrical input quantity with a second variable electrical input quantity, said quantities having positive or negative characteristics, comprising:

(a) a first and second pair of cells, each cell having a light emissive element optically coupled to a photosensitive element, (b) a first discriminator means for coupling said first variable electrical input quantity of positive characteristic to the light emissive elements of said first pair of cells and for coupling said first variable electrical input quantity of negative characteristic to the light emissive elements of said second pair of cells, the coupling of said first positive and negative quantities being mutually exclusive, said first input quantities controlling the light emission from said light emissive elements, (c) a second discriminator means for coupling said second variable electrical input quantity of positive characteristic to the photosensitive elements of one cell of each of said first and second pair of cells and for coupling said second variable electrical input quantity of negative characteristic to the photosensitive elements of the other cell of each of said first and second pair of cells, the coupling of said second positive and negative quantities being mutually exclusive, said second input quantities causing current to pass through said photosensitive elements so as to provide an output electrical quantity proportional to a product of said first and second input quantities, and (d) output means responsive to said output electrical quantity.

2. A mutiplier circuit for obtaining a four quadrant product of a first variable D.C. input voltage with a second variable D.C. input voltage, said voltages being of positive or negative, polarities, comprising:

(a) a first and second pair of electroluminescent-photoconductor cells, each cell having an electroluminescent element optically coupled to a photoconductor element, (b) a first polarity discriminator means for coupling said first variable input voltage of positive polarity to the electroluminescent element of said first pair of cells and for coupling said first variable input voltage of negative polarity to the electroluminescent elements of said second pair of cells, said first input voltages controlling the light emission from said electroluminescent elements, (c) a second polarity discriminator means for coupling said second variable input voltage of positive polarity to the photoconductor elements of one cell of each of said first and second pair of cells and for coupling said second variable input voltage of negative polarity to the photoconductor elements of the other cell of said first and second pair of cells, said second input voltages causing current to pass through said photoconductor elements so as to provide an output electrical quantity proportional to a product of said first and second input voltages, and (d) output means responsive to said output electrical quantity.

3. A multiplier circuit as in claim 2 wherein said first and second polarity discriminator means each comprise a pair of oppositely poled diodes.

References Cited by the Examiner

UNITED STATES PATENTS

| | | | |
|---|---|---|---|
| 2,894,145 | 7/59 | Lehovec | 235—194 XR |
| 3,039,692 | 6/62 | Lohneiss et al. | 235—183 |
| 3,040,178 | 6/62 | Lyman et al. | 250—213 |
| 3,070,306 | 12/62 | DuBois | 235—194 X |
| 3,110,813 | 11/63 | Sack | 250—213 |

MALCOLM A. MORRISON, *Primary Examiner.*

DARYL W. COOK, *Examiner.*